(No Model.)
H. C. SPALDING.
SUBTERRANEAN ELECTRIC CONDUCTOR.
No. 327,485. Patented Sept. 29, 1885.
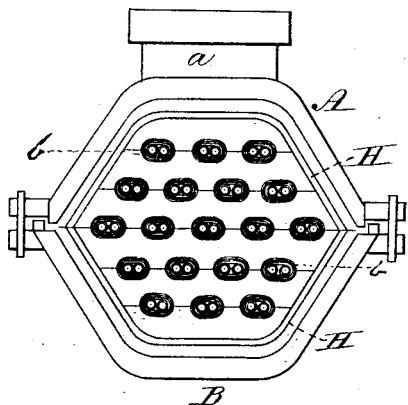
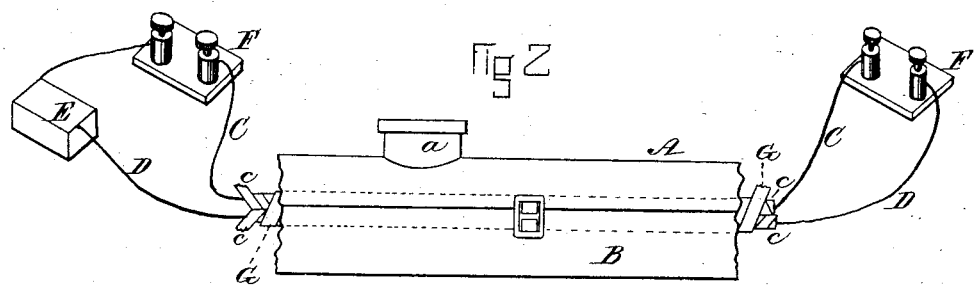
WITNESSES
Sanford H. Duday
Alf. L. Hayes
INVENTOR
Henry C. Spalding

UNITED STATES PATENT OFFICE.

HENRY C. SPALDING, OF BOSTON, MASSACHUSETTS.

SUBTERRANEAN ELECTRIC CONDUCTOR.

SPECIFICATION forming part of Letters Patent No. 327,485, dated September 29, 1885.

Application filed November 24, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Subterranean Electric Conductors, of which the following is a specification, reference being had to the drawings accompanying and forming a part of the same.

With a view mainly to preventing the effects of electrical retardation in conductors in which a metal sheath is employed for shutting-off induced currents from neighboring conductors, I have devised a cable in which two insulated wires forming a complete or round-wire circuit are inclosed in an insulated metallic sheath. This cable is made the subject of an application filed by me November 19, 1883, No. 112,255.

With a view to preventing the retardation due to earth currents heretofore encountered in underground systems in which a number of conductors are contained in a conduit, tube, or pipe, I have used between the group of conductors and the conduit or pipe an insulated metal screen or sheath. This also has been made by me the subject of an application filed November 23, 1883, No. 112,618.

With the twofold object of preventing the retardation due to the induction between the line-wires and the insulating-sheath and that due to the increased electro-static capacity of underground circuits, I have combined the two systems above described, and thereby produced a system in which induction and retardation are practically avoided, and which may be utilized simultaneously for various purposes—such as telephoning and rapid telegraphing—without interference one with another.

My present invention consists in this combination: A conduit, tube, or pipe, cables contained therein, each of which consists of two insulated conductors forming a complete or round-wire circuit, and inclosed in or surrounded by a metallic sheath or jacket, and an insulated metal sheath or screen interposed between the conduit and the cables. The several features of construction here enumerated contribute to the attainment of the desired results. The two wire conductors operate to lessen the induction from neighboring circuits. The metal sheaths inclosing the wires still further reduce or prevent this induction, and by being insulated prevent retardation upon the line, for the reason that the opposite polarities in the latter neutralize the effects produced in the sheath. The screen which incloses the cables operates to eliminate the electro-static induction, and consequent retardation due to the attractive action of the earth's electricity, which would otherwise exert itself deleteriously to the fullest extent upon the sheaths of the individual cables, thus tending to destroy the equilibrium effected by the currents of opposite direction within them.

I have illustrated this invention as applied to a special form of conduit invented by me and described in a previous application.

Figure 1 is a cross-section of the conduit. Fig. 2 is a side elevation of a portion of the same, with an illustration of the circuits.

A B are sections of the conduit, which are to be laid one upon the other and secured in place to form a tube or pipe. Within the conduit are a number of cables constructed in the following manner: Two wires, D C, are separately insulated by spirally-wound bands of paper $c$ $c$, laid or twisted together and inclosed in a sheathing of metal consisting of a spirally-wound strip, G, of metal foil, sheet copper, or the like. A given number of these cables are supported in the conduit by means of sectional or perforated blocks of insulating material placed at intervals, as described in other applications filed by me. Around the group of cables is a metal sheath or screen, H H, preferably formed in sections corresponding to the sections composing the conduit.

The sheath H may be directly inclosed by the outer casing or conduit, or the intervening space, for greater precaution, may be filled with an insulating material.

All the spaces within the conduit should be filled with a plastic insulating compound, which may be introduced through the openings $a$ after the conduit is laid.

Fig. 2 illustrates the manner of using the cables in this system.

E is a battery or generator, and F are the transmitting and receiving instruments, which are connected up in a metallic or round-wire circuit, C D b, formed through one of the cables. Each cable forms a single circuit in this way.

I would state that the special construction of the cables and that of the conduit are not claimed herein, as these are matters which form the subject of other applications.

Although described as applied to a special form of conduit, it is obvious that the invention is equally applicable to many others; and without, therefore, restricting myself in this particular,

What I claim as my invention is—

1. In an underground system, the combination, with a group of cables, each composed of two insulated conductors forming a complete or round-wire circuit, of an insulated metal sheath or screen surrounding and inclosing the cables, substantially as set forth.

2. The combination, with a group of cables, each composed of two insulated conductors forming a complete or round-wire circuit and inclosed within a metallic sheathing or wrapping, of an insulated sheath or screen and an inclosing conduit or casing, all substantially as described.

3. The combination, with a group of cables, each composed of two insulated conductors forming a complete or round-wire circuit and inclosed within a metallic sheathing or wrapping, of a sectional screen and a sectional inclosing conduit or casing, all substantially as herein described.

In witness whereof I have hereunto signed my name in presence of two subscribing witnesses.

HENRY C. SPALDING.

Witnesses:
ALEX. L. HAYES,
SANFORD H. DUDLEY.